United States Patent
Neuzil

[15] 3,696,107
[45] Oct. 3, 1972

[54] IMPROVED HYDROCARBON SEPARATION PROCESS

[72] Inventor: Richard W. Neuzil, 30 Algonquin Road, Des Plaines, Ill. 60016

[22] Filed: May 27, 1971

[21] Appl. No.: 147,564

Related U.S. Application Data

[63] Continuation-in-part of Ser. No. 73,466, Sept. 18, 1970.

[52] U.S. Cl. .............................260/674 SA, 208/310
[51] Int. Cl. ...........................C07c 7/12, C10g 25/04
[58] Field of Search..................260/674 SA; 208/310

[56] References Cited

UNITED STATES PATENTS

| | | | |
|---|---|---|---|
| 3,133,126 | 5/1964 | Fleck et al. | 260/674 |
| 3,201,491 | 8/1965 | Stine et al. | 208/310 |
| 3,205,166 | 9/1965 | Ludlow et al. | 208/310 |
| 3,310,486 | 3/1967 | Broughton et al. | 208/310 |
| 3,558,730 | 1/1971 | Neuzil | 260/674 |

*Primary Examiner*—Delbert E. Gantz
*Assistant Examiner*—C. E. Spresser
*Attorney*—James R. Hoatson, Jr. and Robert W. Erickson

[57] ABSTRACT

A process for the separation of xylene isomers which process employs a type X or type Y structured crystalline aluminosilicate adsorbent to selectively adsorb one of the isomers. Adsorbents included are the type X structured and type Y structured zeolites which contain any number of selected cations including Group IA and Group IIA metals. The operations involved are fluid-solid contacting operations in which the particular improvement resides in the use of a two-stage desorption step in which a first diethylbenzene desorbent stream contacts the adsorbent to displace paraxylene from the adsorptive sites upon the adsorbent, and a second desorption stream containing primarily a saturated component contacts the adsorbent to flush the para-diethylbenzene and desorbed xylene from the interstitial void spaces located between the adsorbent particles.

11 Claims, 1 Drawing Figure

PATENTED OCT 3 1972
3,696,107
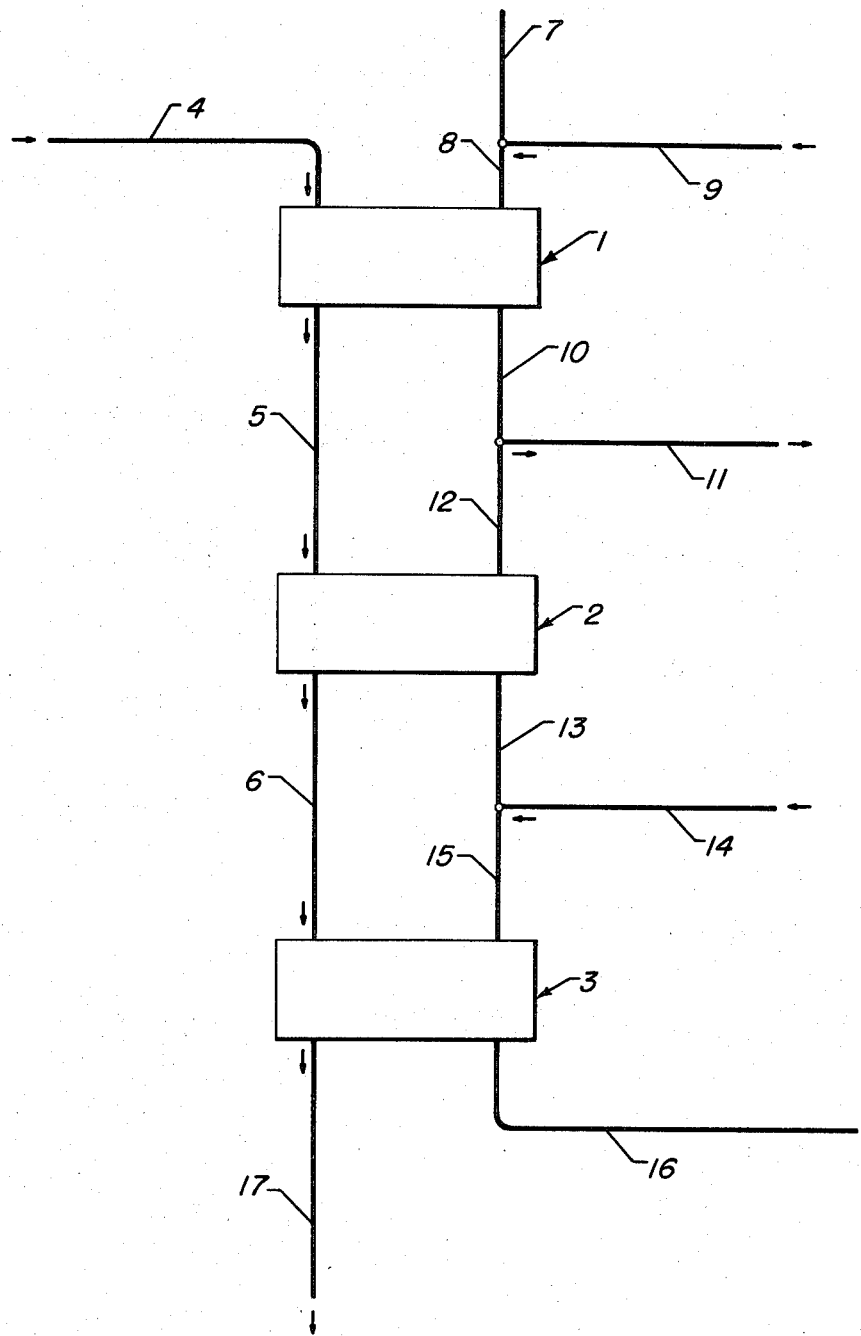
INVENTOR:
Richard W. Neuzil
BY: James R. Hoatson, Jr.
Robert W. Erickson
ATTORNEYS

IMPROVED HYDROCARBON SEPARATION PROCESS

CROSS-REFERENCE TO RELATED APPLICATIONS

This application is a continuation-in-part application of my copending application Ser. No. 73,466 filed on Sept. 18, 1970. The above copending application is incorporated into this specification by specific reference thereto.

BACKGROUND OF THE INVENTION

1. Field of the Invention

The field of art to which this invention pertains is hydrocarbon separation. Specifically, this invention relates to fluid-solid contacting utilizing a crystalline aluminosilicate adsorbent to separate xylene isomers into relatively pure streams of the individual isomers. More specifically, this invention relates to an improved process wherein a dual desorption step is utilized to effectively enhance the separation whereby two desorbent streams are used to first desorb xylene isomers from the adsorptive sites of an adsorbent and second to flush from the interstitial void spaces located between the adsorbent particles.

2. Description of the Prior Art

The prior art contains an abundance of patents relating to the separation of aromatic hydrocarbons using zeolite adsorbents. Particularly, the art is abundant with patents relating to the use of type X structured and type Y structured crystalline aluminosilicates to selectively adsorb at least one aromatic from a feed stock containing a mixture thereof. Various flow schemes have been disclosed including continuous countercurrent fixed-bed operations. The process of this invention utilizes a two-step desorption procedure which has not been disclosed by the art. The basic steps employed include contacting adsorbent with first a para-diethylbenzene desorbent stream followed by a contacting with a second desorbent stream containing little or no para-diethylbenzene, the first desorbent stream effects the desorption of xylene from the adsorbent's selective pore volume into the non-selective void volume of the adsorbent. The adsorbent at this point contains para-diethylbenzene at its selective pore volume and a mixture of para-diethylbenzene and xylene located on the non-selective void volume (interstitial void spaces) of the adsorbent. The second desorbent stream flushes the material from the non-selective void volume of the adsorbent. The second desorbent stream is needed only to physically displace the material present in the non-selective void volume of the adsorbent and therefore is not necessary to be an aromatic type hydrocarbon which must be able, in addition to physically displacing materials present surrounding the adsorbent, to actually compete for adsorptive sites on the adsorbent.

The process of this invention minimizes the para-diethylbenzene desorbent quantity needed for desorption by allowing the use of a second desorbent which may contain little or no para-diethylbenzene.

SUMMARY OF THE INVENTION

The invention defined by the attached claims can be summarized as an improved process for separating xylenes utilizing a para-diethylbenzene desorbent, wherein an improvement in the process resides in utilizing a two-step desorption procedure consisting of first contacting an adsorbent loaded with selectively adsorbed xylenes with a desorbent stream containing para-diethylbenzene and subsequently contacting the adsorbent with a desorbent stream containing a reduced amount or in some instances no para-diethylbenzene.

The advantages which are obtained through the use of this invention are that a reduced quantity of para-diethylbenzene desorbent material is needed when the improvement is effected. The advantages are obtained by the use of a second desorption stream which contains a reduced amount of paradiethylbenzene or in some cases essentially no para-diethylbenzene to flush both para-diethylbenzene and xylene from the interstitial void spaces located between adsorbent particles. Prior to the above step the adsorbent particles had been contacted with a para-diethylbenzene desorbent material to displace xylene from the selective pore volume (adsorptive sites) within the adsorbent.

In general terms of utility this invention resides in the production of concentrated xylene isomer product streams which can be used in many processes as raw materials.

BRIEF DESCRIPTION OF THE DRAWING

The attached drawing specifically illustrates the improvement the process of this invention. Basically, the drawing shows operating zones 1, 2 and 3 in which various operations take place in a normal countercurrent separation process. In order to more easily illustrate the improvement of the process of this invention, a moving bed system with fixed fluid input and output streams is utilized in the drawing. The solid adsorbent which comprises either a type X structured or type Y structured zeolite passes in a downward direction through the various operational zones via lines 4, 5, 6 and 17. It is contemplated that the adsorbent which passes out of line 17 can be reused in the process after undergoing other operations and passed back to operating zone 1 via line 4. This allows a continuous use of adsorbent material. The operating zones described include a rectification zone 1, a desorption zone 2 and a buffer zone 3. Other zones are necessary for a separation to take place, but since the improvement of this invention resides in the two-step desorption operations it is only necessary to describe this part of an overall moving bed system.

The overall fluid flow in the process is in a direction opposite to that of the solid adsorbent, or in an upward direction. Lines 7, 8, 10, 12, 13, 15, and 16 are fluid transfer lines through which fluid passes in an upward direction. With fluid passing in an upward direction and the solid passing in a downward direction a true counter-current operation is achieved. It is assumed that in the countercurrent operation that solid passes into operational zone 1 and contacts fluid passing into that zone via line 10. Fluid which has contacted the solid adsorbent passes out of zone 1 via line 8. The same essential input and output operations take place in both zones 2 and 3. The individual zones can be any number of a series of beds or chambers in which a stationary fixed bed of adsorbent is located and the input and output streams (lines 9, 11 and 14) shifted throughout the process in order to induce a simulated moving bed process which in fact does produce a true countercurrent fluid-solid contacting process.

The input and output streams 9, 11 and 14 as shown in the drawing are used to transfer fluid material into and out of the process. Fluid input line 9 is a feed input stream. Line 11 is an extract output stream. Line 14 is a desorbent inlet stream. The feed stream which passes through line 9 contains a feed mixture of which one of the components is desired to be recovered in a more purified state. Line 11 through which an extract stream passes generally contains the component or components of the feed stock which are selectively adsorbed by the adsorbent together with desorbent material which has been used to desorb the extract material from the adsorbent in desorption zone 2. Line 14 carries two desorbent streams which pass into the process to effect the improvement of this invention.

In normal operations a para-diethylbenzene containing stream is continuously passed through lines 14 and 13 into zone 2 to effect desorption of extract material from the adsorbent. In the improvement of this invention the same desorbent stream location is used but two different materials are passed through line 14 to effect the improvement. The two streams in order of passage through line 14 during normal operations comprise a first desorbent stream containing para-diethylbenzene and the second desorbent stream containing a reduced quantity or in some cases no para-diethylbenzene. Preferably the second desorbent stream contains no para-diethylbenzene and generally comprises a branched or straight chain paraffin or a cyclo-paraffin or a mixture of both.

The essential operations taking place in rectification zone 1 are the purging of raffinate from the non-selective void volume (interstitial space) of the adsorbent and the desorption of any raffinate materials from the selective pore volume (adsorptive sites) of the adsorbent. The purging is effected by passing a portion of the extract through the line 10 into the rectification zone rather than out of the process via line 11. The extract stream contains both extract and desorbent material which are able to desorb raffinate from the adsorbent. The adsorbent which leaves rectification zone 1 via line 5 contains essentially no raffinate materials present at the selective pore volume or the non-selective void volume of the adsorbent. Consequently, when the adsorbent passes out of rectification zone 1 and into desorption zone 2 via line 5 it is essentially free of raffinate materials which would reduce the purity of the extract material taken out of the process via line 11.

In desorption zone 2 desorbent material passes into that zone via lines 14 and 13 and desorbs extract material from the selective pore volume of the adsorbent. The desorbed material is withdrawn from the desorption zone via lines 12 and line 11 to be recovered as an extract stream.

Specific operations taking place as the improvement of this invention in desorption zone 2 are described as follows: A first desorbent stream containing para-diethylbenzene contacts the adsorbent material in the desorption zone. The adsorbent contains for the most part a selectively adsorbed feed component (extract material) within the selective pore volume of the adsorbent. There may also be various quantities of extract material located in the non-selective void volume between the adsorbent particles. The para-diethylbenzene desorbent (first desorbent stream) passing into the desorption zone causes the extract material which was adsorbed by the adsorbent to be displaced from the selective pore volume of the adsorbent since the para-diethylbenzene is capable of competing for adsorptive sites which make up the selective pore volume of the adsorbent. The second desorbent is deficient in para-diethylbenzene and preferably contains no para-diethylbenzene. The second desorbent stream is not able to compete for adsorptive sites on the adsorbent and is not able to desorb extract material from the adsorbent. However, enough of the para-diethylbenzene in the first desorbent stream is passed into the desorption zone to allow substantially all of the extract material to be desorbed from the adsorbent and replaced by para-diethylbenzene from the first desorbent stream. Therefore, the only purpose the second desorbent stream serves is to physically displace the materials located within the non-selective void volume (interstitial void spaces between the adsorbent particles) of the adsorbent from the adsorbent. By utilizing the second desorbent stream it is possible to reduce the quantities of para-diethylbenzene needed to desorb since the para-diethylbenzene is used to compete for adsorptive sites on the adsorbent and not to physically displace material from the non-selective void volume of the adsorbent. A paraffinic material which may be used as the second desorbent stream thereby effects essentially the same operation which would take place had a para-diethylbenzene desorbent stream been used for the second desorbent stream. The second desorbent stream reduces quantity of para-diethylbenzene which is needed to effect the separation and does not decrease the efficiency of the process or the purity of the extract material recovered from the process.

The adsorbent which leaves desorption zone 2 contains essentially only para-diethylbenzene desorbent at the selective pore volume of the adsorbent and the second desorbent stream material at the non-selective void volume of the adsorbent.

The adsorbent passing into buffer zone 3 then can contact either a raffinate stream or another hydrocarbon stream to displace the para-diethylbenzene from the selective pore volume of the adsorbent and recover it for reuse in the process.

The raffinate material which is withdrawn from the process in an upstream location with respect to the rectification zone can pass into a raffinate material separation means. The raffinate can be separated into a raffinate product stream containing essentially the feed components not adsorbed by the adsorbent and para-diethylbenzene.

The para-diethylbenzene is used as a desorbent to push adsorbed para-xylene from the selective pore volume of the adsorbent during desorption operations. As the adsorbent which has previously been located in desorption zone 2 passes into adsorption zone 1 it carries adsorbed para-diethylbenzene. The para-xylene in the feed is able to desorb some of the para-diethylbenzene from the adsorbent since the mass action effects in the adsorption zone favor this occurrence. In certain instances, most of the para-diethylbenzene present in the adsorbent ends up in the raffinate stream. In these cases it is preferable to fractionate the raffinate material into a raffinate product stream and a concentrated stream of para-diethylbenzene which can be used in the improvement of this process as the first desorbent stream. The second desorbent stream is then derived from a fractionated extract output stream.

The extract output stream 11 can pass into an extract separation means which is able to separate the extract output stream into a concentrate stream of para-xylene and desorbent material. The desorbent material may be para-diethylbenzene or a mixture of para-diethylbenzene and another hydrocarbon or a hydrocarbon essentially free of para-diethylbenzene. In instances where the desorbent from the extract separation means contains a relatively low concentration of para-diethylbenzene it can be passed to the desorption zone as the second desorbent stream.

The raffinate separation means and the extract separation means can comprise any type process which can easily separate the streams fed to these means into concentrated streams of raffinate material, extract material, the first desorbent stream and the second desorbent stream. In some instances the first and second desorbent streams are derived in part or whole from sources other than the raffinate or extract separation means.

DESCRIPTION OF THE PREFERRED EMBODIMENTS

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes. In the process of this invention, however, the term molecular sieves is not suitable since the separation of aromatics is dependent on electro-chemical attraction of different isomer configurations rather than pure physical size differences in the molecules.

In a hydrated form, the crystalline aluminosilicates generally encompasses those zeolites represented by the formula in equation 1 below:

$$M_{2/n}O:Al_2O_3:w\ SiO_2:y\ H_2O \qquad 1.$$

where M is a cation which balances the electrovalence of the tetrahedra and is generally referred to as an exchangeable cationic site, $n$ represents the valence of the cation, $w$ represents the moles of $SiO_2$ and $y$ represents the moles of water. The cations may be any one of a number of cations which will hereinafter be described in detail.

The type X structured and type Y structured zeolites as used in this specification shall include a crystalline aluminosilicates having a three dimensional interconnected cage structures and can specifically be defined in U.S. Pat. Nos. 2,882,244 and 3,130,007. The terms type X structured and type Y structured zeolites shall include all zeolites which have a general structure as represented in the above two cited patents and specifically including those structured containing various cations exchanged upon the zeolite.

The type X structured zeolites can be represented in terms of mole oxides as represented by the formula in equation 2 below:

$$0.9 \pm 0.2M_{2/n}O:Al_2O_3:2.5 \pm 0.5SiO_2: y\ H_2O \qquad 2$$

where M represents at least one cation having a valence of not more than 3, $n$ represents the valence of M and Y is a value UP to about 9 depending upon the identity of m and the degree of hydration of the crystalline.

The type Y structure zeolites can be represented in terms of the mole oxides for the sodium form as represented by the formula in equation 3 below $$0.9 \pm 0.2Na_2O:Al_2O_3:wSiO_2: y\ H_2O \qquad (3)$$

where $w$ is a value of greater than about 3 up to 8, and $y$ may be any value up to about 9.

Adsorbents contemplated herein include not only the sodium form of the type Y zeolite but also crystalline materials obtained from such a zeolite by partial or complete replacement of the sodium cation with other individual cations or groups of cations. Similarly, the type X zeolite also may be ion-exchanged.

Cationic or base exchange methods are generally known to those familiar with the field of crystalline aluminosilicate production and are generally performed by contacting the zeolite with an aqueous solution of soluble salts of the cation or cations desired to be exchanged upon the zeolite. The desired degree of exchange takes place before the sieves are removed from the aqueous solution, washed and dried to a desired water content. It is contemplated that cation exchange operations of the cation exchange may take place using individual solutions of desired cations placed on the zeolite or using an exchange solution containing a mixture of cations, where two or more desired to be placed on the zeolite.

The cations which may be placed upon the zeolite include cations selected from but not limited to the Group IA, Group IIA and Group IB metals. Specific cations which show a preferential selectivity for para-xylene with respect to ethylbenzene include lithium, sodium, potassium, rubidium, cesium, beryllium, magnesium, calcium, strontium, barium, silver, manganese, cadmium, and copper. These cations should be used in an adsorptive separation process in which para-xylene and ethylbenzene are desired to be separated. In instances where the above cations were used, para-xylene would be the preferentially adsorbed component of the feed mixture. The following combination of cations are known to be particularly well suited for a para-xylene and ethylbenzene separation. These cations include potassium and barium, potassium and beryllium, potassium and manganese, rubidium and barium, cesium and barium, copper and cadmium, copper and silver, zinc and silver, and copper and potassium.

Cations which have shown a preferential selectivity of para-xylene with respect to meta-xylene and ortho-xylene include potassium, barium, sodium, silver along with the certain cation pairs including potassium and barium, potassium and beryllium, potassium and magnesium, potassium and rubidium, potassium and cesium, barium and rubidium, cesium and barium, and copper and potassium.

When singular cations are base exchanged upon a zeolite the singular cations can comprise anywhere from 5 up to to 75 wt. percent of the zeolite depending upon the molecular weight of the material exchanged upon the zeolite. The percentages based on the volatile free basis is generally expressed as VF and is the percentage of the material upon the zeolite after the zeolite has been exposed to inert gas purge for 500° C. for a time period to allow the zeolite to reach a constant weight. It is contemplated that when single ions are placed upon the zeolite to be used to selectively adsorb the para-xylene that this cation may be ion-exchanged from the zeolite to place anywhere from about 1 percent up to about 100 percent of the original cations present (generally sodium or calcium) upon the zeolite prior to its being ion-exchanged. By knowing the emperical formula including the silica over alumina ratio of the zeolite used, its water content in the type zeolite used whether it be a type $X$ or type $Y$ structured zeolite and the percentage of binder used if any, it is possible to calculate after ion-exchanging the percentage of ion exchange that has taken place.

When two or more than one cations placed upon the zeolite there are two parameters in which one can operate in order to effectively produce a zeolite having the maximum selective properties. One of the parameters is the extent of ion-exchange the zeolite which is determined by the length of time and ion exchange conditions and the other parameter is the ratio of individual cations placed on the zeolite. In instances in which the cation pairs comprise a group IIA metal and a group IA metal the weight ratio of these two components upon the zeolite can vary anywhere from about less than one up to about 80 depending upon the molecular weight of the Group IIA or Group IA metal. A particular useful zeolite is one which contains barium and potassium cations having a weight ratio of barium to potassium of from about 1 to about 40 and preferably in the range of about 1 to about 30. A ratio of from about 5 to about 15 is an especially preferred range. The cations when using Group IIA and Group IA metals can occupy from about 20 up to 100 percent the ion exchangeable sites located upon the zeolite. In some instances, substantially all of the original cations placed on the zeolite are removed therefrom by the cations exchanged.

Cations other than the Group IA or the Group IIA metals being placed on the zeolite in order that from about 10 to about 100 percent of original cations present within the zeolite are replaced by these metals. If a plurality of cations are utilized the weight ratio of the cations can be utilized which allows the paraxylene to be selectively adsorbed with respect to metaxylene, orthoxylene and ethylbenzene.

In testing the various adsorbents two particular properties are found to be of importance in determining proper operating conditions to effect a reasonable separation of feed components. The two physical properties are the selective pore volume of the adsorbent and the nonselective void volume of the adsorbent. The term "selective pore volume" of the adsorbent is defined as the volume of the adsorbent which selectively adsorbs extract components from the feed stock. In the process of this invention, this volume is referred to as the volume of adsorbent which selectively adsorbs para-xylene with respect to other feed isomers which para-xylene and other isomers are contacted with an adsorbent material. The term "non-selective void volume" of the adsorbent includes the cavities of the adsorbent which contain no selective adsorptive sites and the interstitial void spaces between the adsorbent particles. The "non-selective void volume" of the adsorbent offers no help in separating feed isomers and is considered as dead space within the adsorbent. The selective pore volume and the non-selective void volume are generally expressed in volumetric quantities and are of importance in determining proper flow rates of fluid required to contact the adsorbent, for an efficient separation to take place.

The $C_8$ aromatic hydrocarbons which can be used as feed streams in the process of this invention include ortho-xylene, meta-xylene, para-xylene and ethylbenzene. Other materials may be included in the feed stream in relatively small amounts and they include paraffins, olefins, naphthenes and other type hydrocarbons that are not generally found in $C_8$ aromatic streams. In some instances other aromatic hydrocarbons such as benzene, or toluene or heavier aromatics such as the diethylbenzenes or cymenes may be in the feed stock as an impurity. In some instances it may be desired to pretreat the feed stock in order to substantially reduce the contaminant material present in the feed streams. Typically, the feed streams can be derived from catalytic isomerization units or from reforming units in which operations are controlled to produce a high quantity of aromatic components.

Adsorption conditions include temperatures within the range of from about 30° to about 350° C. and preferably within the range of from about 40° to about 250° C. with pressures within the range of from atmospheric to about 1,000 psig. or higher. Preferably lower pressure ranges should be utilized such as pressures within the range of from about 100 to about 400 psig. in order to reduce the expenses in producing units to operate under relatively high pressures. Both liquid phase and vapor phase operations can be used in the adsorption step but is preferred to employ liquid phase because of the reduced temperature requirements and the decreasing opportunities for any side reactions to occur when the temperatures are minimized. It is especially preferred to perform adsorption operations in an isothermal manner, thereby making process control that much easier.

Description temperature and pressure conditions include substantially the same limitations as described above for adsorption operations. Additionally, desorption conditions include the improvement — namely, a two-step desorption operation including a first contacting of an adsorbent with a para-diethylbenzene desorbent and a subsequent contacting of the same adsorbent with a stream containing a reduced quantity of para-diethylbenzene. The second desorbent stream may be a mixture of a saturated hydrocarbon with little or no para-diethylbenzene.

Particular desorbents which can be used in the process of this invention include a first desorbent stream which contains para-diethylbenzene and a second desorbent stream which contains a reduced quantity of para-diethylbenzene or preferably no para-diethylbenzene. Specifically, the first desorbent stream should contain para-diethylbenzene either alone or in admixture with other diethylbenzene isomers such as ortho-diethylbenzene or meta-diethylbenzene along with small quantities of butyl benzene. The para-diethylbenzene, either alone or with other isomers, may be in admixture with a saturated hydrocarbon or some other inert hydrocarbon which will not effect the desorption ability of the para-diethylbenzene when it is required to displace para-xylene from the adsorptive sites located within the selective pore volume of the adsorbent. The concentrations of para-diethylbenzene when it is used in the first desorbent stream can vary anywhere from 5 vol. percent up to about 100 vol. percent of the total first desorbent stream passed into the process. Preferably there should be from about 5 to about 60 vol. percent of para-diethylbenzene with an even more preferable range of from about 30 to about 50 vol. percent of the total first desorbent stream material. In instances in which the mixed diethylbenzenes are used as a component in the first desorbent stream and are present in an undiluted form, they typically contain about 60 vol. percent meta-diethylbenzene, 7 vol. percent ortho-diethylbenzene, 26 vol. percent para-diethylbenzene along with about 7 vol. percent of butylbenzenes. Diluents which can be used with the para-diethylbenzene in the first desorbent stream include materials saturated hydrocarbons such as the branched or straight chain paraffinic hydrocarbons, cyclo-paraffins, polynuclear ring compounds and combinations thereof. Typically the inert diluent materials from the saturated paraffins will consist of the straight or branched chain paraffins having from about 4 to about 20 carbon atoms per molecule and preferably having from about 4 to about 10 carbon atoms per molecule. Cycloparaffins can include the cyclohexanes, cyclopentanes, and alkyl derivatives thereof. Polynuclear ring compounds include Decalin and alkyl derivatives thereof.

The second desorbent stream should preferentially contain a minimal quantity of para-diethylbenzene. It is especially preferred that this desorbent stream contain essentially no para-diethylbenzene. The second desorbent stream need not be a material which is required to enter the selective pore volume of the adsorbent, since the purpose of the second desorbent stream is to physically displace material from the non-selective void volume of the adsorbent. The typical second desorbent stream can contain various concentrations of cyclo-paraffins including cyclo-pentane, cyclo-hexane, and alkyl derivatives thereof. This stream can also contain branched or straight chained paraffins or the polynuclear hydrocarbons. It is preferred that the hydrocarbons used in the second desorbent stream, whether they be cyclo-paraffins, paraffins or polynuclear, contain from about 4 to about 20 carbon atoms per molecule and preferably from about 4 to about 10 carbon atoms per molecule. In some instances the second desorption stream may contain small quantities of para-diethylbenzene or other aromatic hydrocarbons. The amount of para-diethylbenzene should be minimized and preferably should be less than about 20 vol. percent of the second desorbent stream passed into the desorption zone. It is especially preferred to use a second desorbent stream which is totally free of para-diethylbenzene, since it is an object of this invention to minimize the para-diethylbenzene inventory.

When referring to a second desorbent stream containing less para-diethylbenzene than said first desorbent stream, I mean the ratio of the volume percent of para-diethylbenzene in the first desorbent stream over the volume percent of para-diethylbenzene in the second desorbent stream can vary any where from greater than one to infinity. It is preferable that there be a minimum quantity of diethylbenzene in the second desorbent stream.

The separation operation disclosed can take place in moving bed countercurrent flow processes and the fixed bed countercurrent simulated moving bed systems. Batch type operations can also be effected utilizing the improvement of this invention. In many instances batch type operations can more easily be effected by using desorption conditions including gas purges and vacuum desorption rather than the two step desorption procedure claimed here.

Operations in which a column of adsorbent is utilized and feed streams, raffinate output streams, desorbent input streams and extract output streams are alternately and unidirectionally shifted through the bed allowing adsorption and desorption operations to take place within the adsorption column are described in publications currently available. The continuous adsorption operations are particularly described in a published article by D. B. Broughton, R. W. Neuzil, J. M. Pharis and C. S. Breeley, entitled "The Parex Process for Recovering Para-Xylene," Chemical Engineering Progress, Volume 66 No. 9 pages 70 through 75, September 1970. This published article generally describes the countercurrent operation in which the two step desorption operation of this invention can be utilized.

I claim as my invention:

1. In an improved process for the separation of para-xylene from a feed containing a mixture of $C_8$ aromatic hydrocarbons, which process employs crystalline aluminosilicate adsorbent particles selected from the group consisting of Type $X$ structured and Type $Y$ structured zeolites containing at least one selected cation at the exchangeable cationic sites in said zeolite and having interstitial void spaces between said particles, said process comprising the steps of:

i. contacting said adsorbent with said feed at adsorption conditions to effect the selective adsorption of para-xylene by the adsorbent;

ii. removing a raffinate material which comprises less selectively adsorbed components of the feed from said adsorbent;

iii. contacting said adsorbent with a desorbent material containing para-diethylbenzene at desorption conditions to effect the desorption of said para-xylene from said adsorbent;

iv. removing from said adsorbent an extract material comprising paraidiethylbenzene and para-xylene; wherein the improvement comprises using a two-step desorption operation in which:

a. a first desorbent stream containing para-diethylbenzene, contacts said adsorbent to effect the desorption of para-xylene from said adsorbent and into said interstitial void spaces between said particles; and b. a second desorbent stream containing a lower concentration of para-diethylbenzene as compared to said first desorbent stream contacts said adsorbent to effect the flushing of desorbed para-xylenes from the interstitial void spaces between said adsorbent particles.

2. The process of claim 1 further characterized in that said adsorbent contains at least one cation selected from the group consisting of lithium, sodium, potassium, beryllium, magnesium, calcium, strontium, barium, nickel, copper, silver, manganese, cadmium and combinations thereof.

3. Claim 2 further characterized in that said adsorbent contains at least one pair of cations selected from the group consisting of potassium and barium, potassium and beryllium, potassium and magnesium, rubidium and barium, cesium and barium, potassium and rubidium, and potassium and cesium and combinations thereof.

4. In an improved process for the separation of para-xylene from a feed containing a mixture of $C_8$ aromatic hydrocarbons which process employs a crystalline aluminosilicate adsorbent particles selected from the group consisting of Type $X$ structured and Type $Y$ structured zeolites containing at least one selected cation at the exchangeable cationic sites within said zeolite and having interstitial void spaces between said particles, said process comprising the steps of:

i. contacting said adsorbent with said feed at adsorption conditions to effect the selective adsorption of para-xylene by the adsorbent;

ii. removing a raffinate material from the adsorbent which comprises less selectively adsorbed components of the feed;

iii. contacting said adsorbent with a desorbent material containing para-diethylbenzene at desorption conditions to effect the desorption of said para-xylene from said adsorbent;

iv. removing extract material comprising para-diethylbenzene and para-xylene from said adsorbent;

wherein the improvement comprises using desorption conditions comprising a two step desorption operation in which:

a. a first desorbent stream containing para-diethylbenzene contacts said adsorbent to effect the desorption of para-xylene therefrom; and b. a second desorbent stream comprising a saturated hydrocarbon containing less para-diethylbenzene than said first desorbent stream contacts said adsorbent to effect the flushing of desorbed para-xylene and said first desorbent stream from the interstitial void spaces between said particles.

5. Claim 4 further characterized in that said adsorbent contains at least one cation selected from the group consisting of lithium, sodium, potassium, beryllium, magnesium, calcium, strontium, barium, nickel, copper, silver, manganese, cadmium, and combinations thereof.

6. Claim 5 further characterized in that said adsorbent contains at least two pairs of cations selected from the group consisting of potassium and barium, potassium and beryllium, potassium and magnesium, rubidium and barium, cesium and barium, potassium and rubidium, and potassium and cesium, and combinations thereof.

7. Claim 4 further characterized in that said first desorbent stream contains more than ten volume percent para-diethylbenzene.

8. Claim 4 further characterized in that said second desorbent contains less than ten volume percent para-diethylbenzene.

9. Claim 8 further characterized in that said second desorbent stream contains less than two volume percent para-diethylbenzene.

10. Claim 9 further characterized in that said second desorbent stream is free of para-diethylbenzene.

11. An improved process for the separation of para-xylene from a feed containing a mixture of $C_8$ aromatic hydrocarbons, which process employs crystalline aluminosilicate adsorbent particles selected from the group consisting of Type $X$ structured and Type $Y$ structured zeolites containing at least one selected cation at the exchangeable cationic sites within said zeolite and having interstitial void spaces between said particles, said process comprising the steps of:

i. contacting said adsorbent with said feed at adsorption conditions to effect the selective adsorption of para-xylene on the adsorbent by displacing para-diethylbenzene present at the selective pore volume of the adsorbent from a hereinafter defined desorption operation;

ii. removing a raffinate material from the adsorbent which comprises the less selectively adsorbed components of the feed stock and displaced para-diethylbenzene;

iii. contacting said adsorbent with desorbent material containing para-diethylbenzene at desorption conditions to effect a desorption of said para-xylene from said adsorbent by para-diethylbenzene which is adsorbed at the selective pore volume of the adsorbent;

iv. removing extract material comprising para-xylene and desorbent material from said adsorbent;

v. passing at least a portion of the raffinate material to a raffinate separation means at separation conditions to effect the separation of para-diethylbenzene from the feed stock components in the raffinate material;

vi. passing at least a portion of said extract material to an extract separation means at separation conditions to effect the separation of para-xylene from desorbent material;

wherein the improvement comprises using desorption conditions comprising a two-step desorption operation in which:

a. a first desorbent stream derived from said raffinate separation means containing para-diethylbenzene contacts said adsorbent to effect the desorption of para-xylene therefrom, and b. a second desorbent stream derived from said extract separation means comprising material containing less para-diethylbenzene than said first desorbent stream contacts said adsorbent to effect the flushing of desorbed para-xylene from the interstitial void spaces from said particles.

* * * * *